United States Patent
Butler

(10) Patent No.: US 9,539,767 B2
(45) Date of Patent: Jan. 10, 2017

(54) FORMING OF STAGED THERMOSET COMPOSITE MATERIALS

(71) Applicant: The Boeing Company, Chicago, IL (US)

(72) Inventor: Geoffrey A. Butler, Seattle, WA (US)

(73) Assignee: The Boeing Company, Chicago, IL (US)

( * ) Notice: Subject to any disclaimer, the term of this patent is extended or adjusted under 35 U.S.C. 154(b) by 251 days.

(21) Appl. No.: 14/561,900

(22) Filed: Dec. 5, 2014

(65) Prior Publication Data

US 2016/0159057 A1    Jun. 9, 2016

(51) Int. Cl.
| | | |
|---|---|---|
| *B29C 35/02* | (2006.01) | |
| *B29C 70/30* | (2006.01) | |
| *B29C 70/44* | (2006.01) | |
| *B29C 73/10* | (2006.01) | |
| *B29C 73/12* | (2006.01) | |
| *B29C 65/00* | (2006.01) | |
| *B29K 105/24* | (2006.01) | |

(52) U.S. Cl.
CPC ............... *B29C 70/30* (2013.01); *B29C 35/02* (2013.01); *B29C 35/0222* (2013.01); *B29C 35/0288* (2013.01); *B29C 70/44* (2013.01); *B29C 73/10* (2013.01); *B29C 73/12* (2013.01); *B29C 66/73754* (2013.01); *B29K 2105/243* (2013.01)

(58) Field of Classification Search
CPC ............ B29C 35/0299; B29C 35/0222; B29C 66/73753; B29C 66/73754
USPC ........................................................ 156/285
See application file for complete search history.

(56) References Cited

U.S. PATENT DOCUMENTS

| | | | | |
|---|---|---|---|---|
| 5,672,311 A | * | 9/1997 | May ..................... | B29C 70/42 264/101 |
| 5,954,898 A | * | 9/1999 | McKague ............. | B29C 70/342 156/182 |
| 6,852,259 B2 | | 2/2005 | Michael | |
| 7,182,832 B2 | | 2/2007 | Behnke et al. | |
| 8,834,668 B2 | | 9/2014 | Nelson et al. | |

(Continued)

OTHER PUBLICATIONS

Encyclopedia of Polymer Science and Technology on "Gel Point" at http://onlinelibrary.wiley.com/doi/10.1002/0471440264.pst476/pdf, 2016, pp. 1-15.*

(Continued)

*Primary Examiner* — Scott W Dodds

(57) ABSTRACT

A method of forming a composite article may include initially curing a composite laminate at an initial temperature to an initial cure stage of 30-50 percent of full cure and beyond a gel point to form an initially-cured composite laminate. The method may initially include heating the initially-cured composite laminate to an intermediate temperature higher than the initial temperature and above a resin glass transition temperature. In addition, the method may include intermediately curing the composite laminate to an intermediate cure stage of 50-70 percent of full cure while on a final forming tool to form an intermediately-cured composite laminate. Furthermore, the method may include removing the intermediately-cured composite laminate from the final forming tool, and finally curing the intermediately-cured composite laminate at a final temperature higher than the intermediate temperature to a final cure stage.

20 Claims, 12 Drawing Sheets

(56) References Cited

U.S. PATENT DOCUMENTS

2010/0252180 A1* 10/2010 Rincon ............ B29C 66/43441
 156/182
2011/0139769 A1 6/2011 Miller et al.

OTHER PUBLICATIONS

CYTEC Engineering, "CYCOM 5320 Data Sheet," dated Mar. 2012.

* cited by examiner

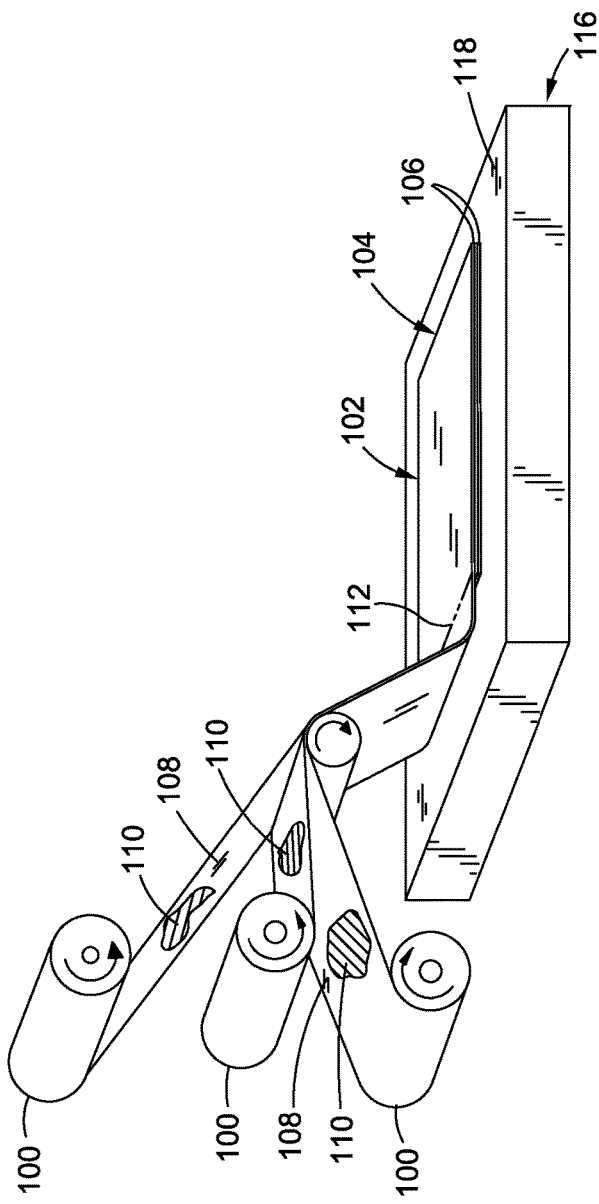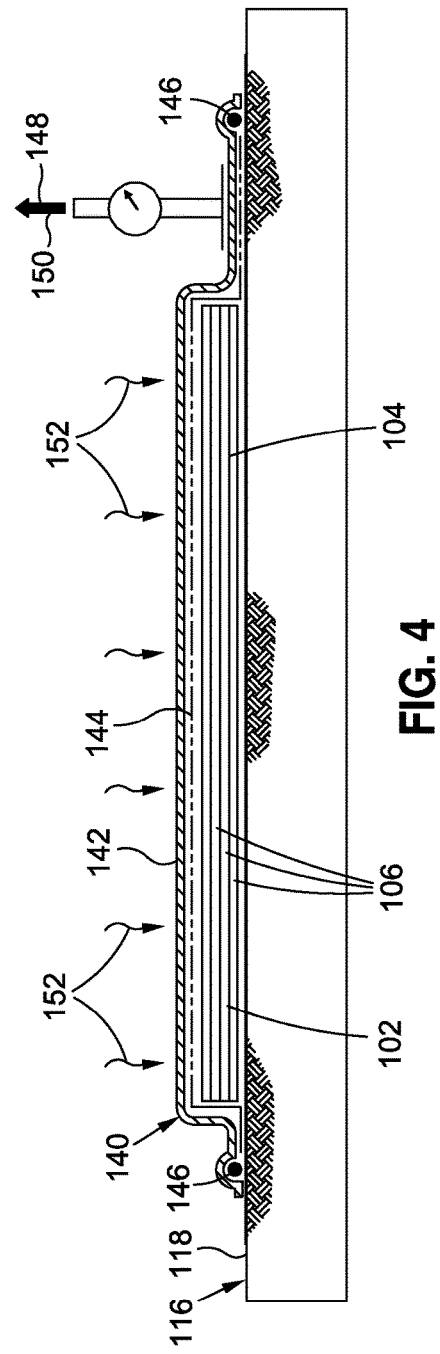

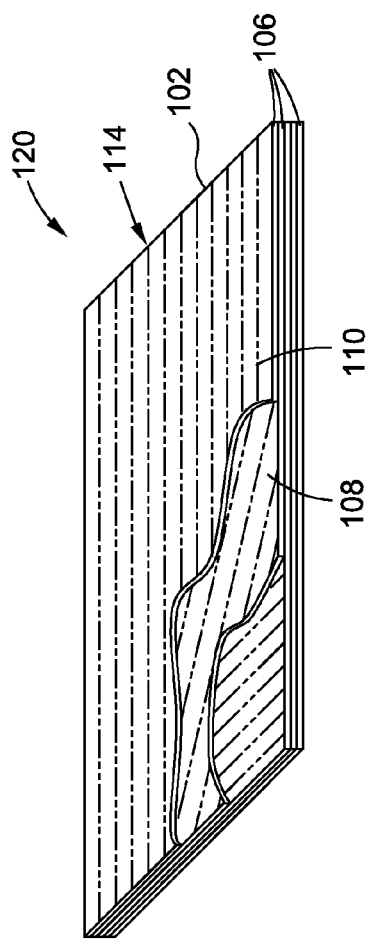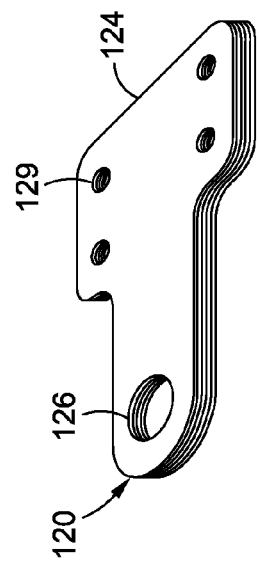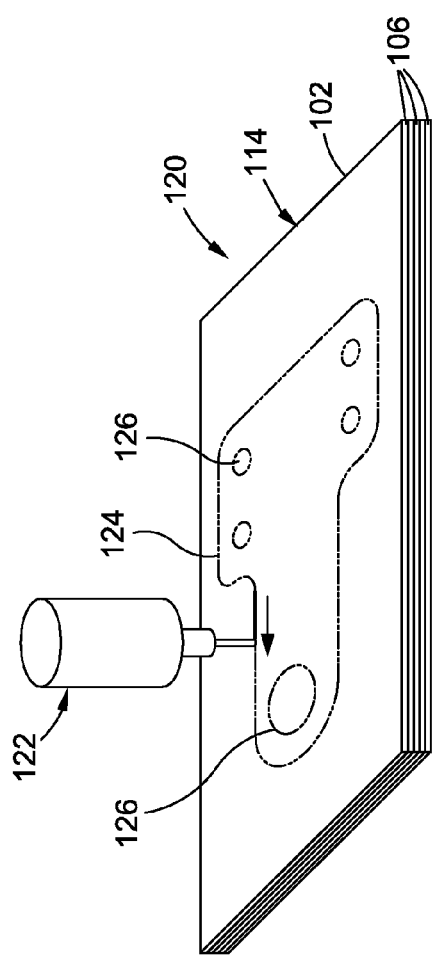

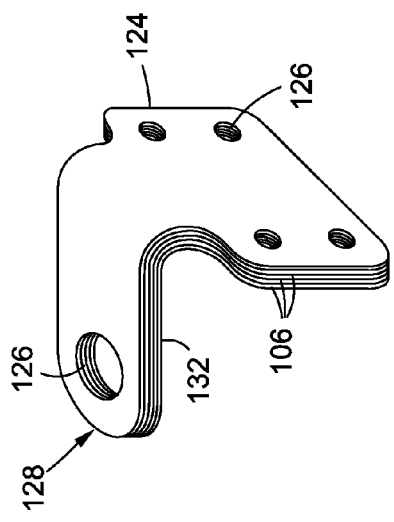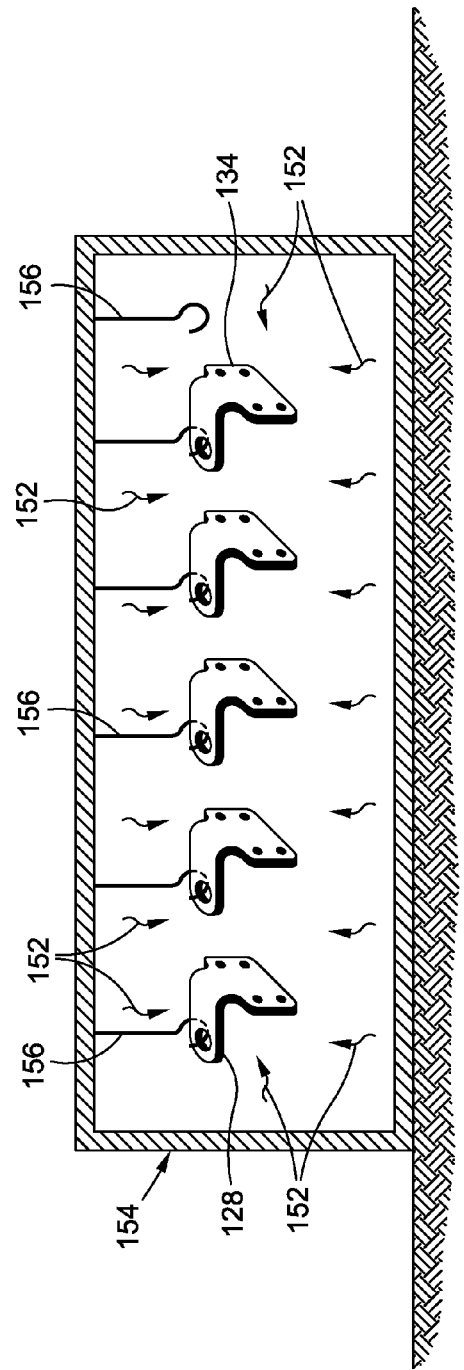

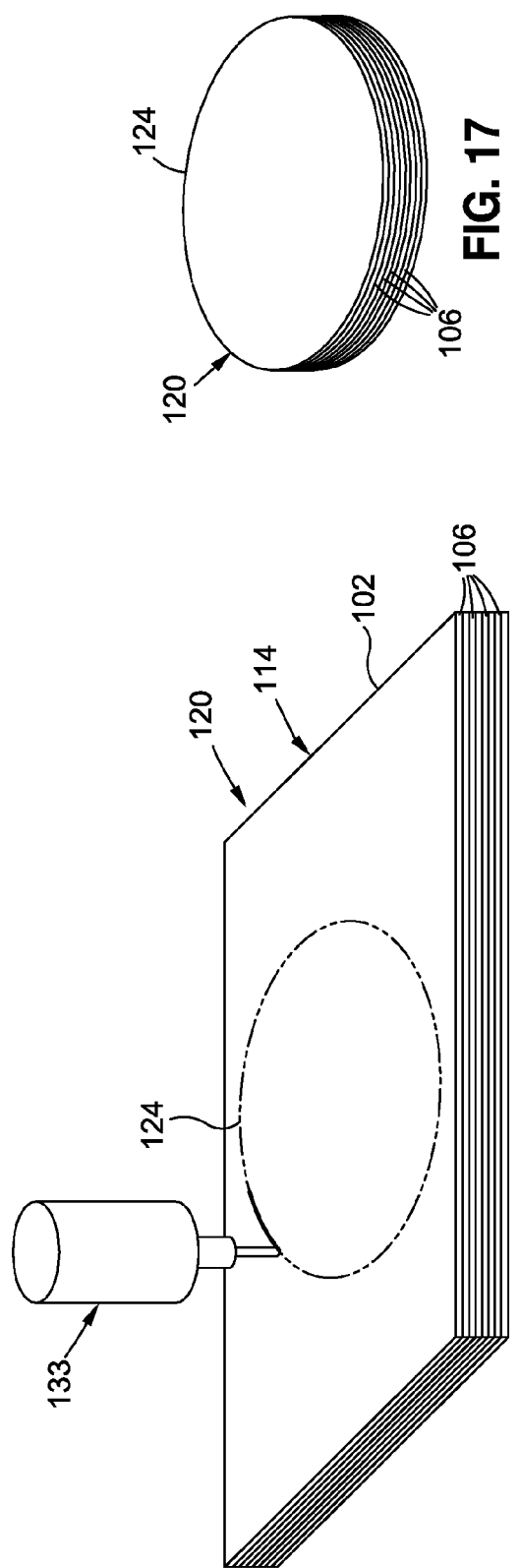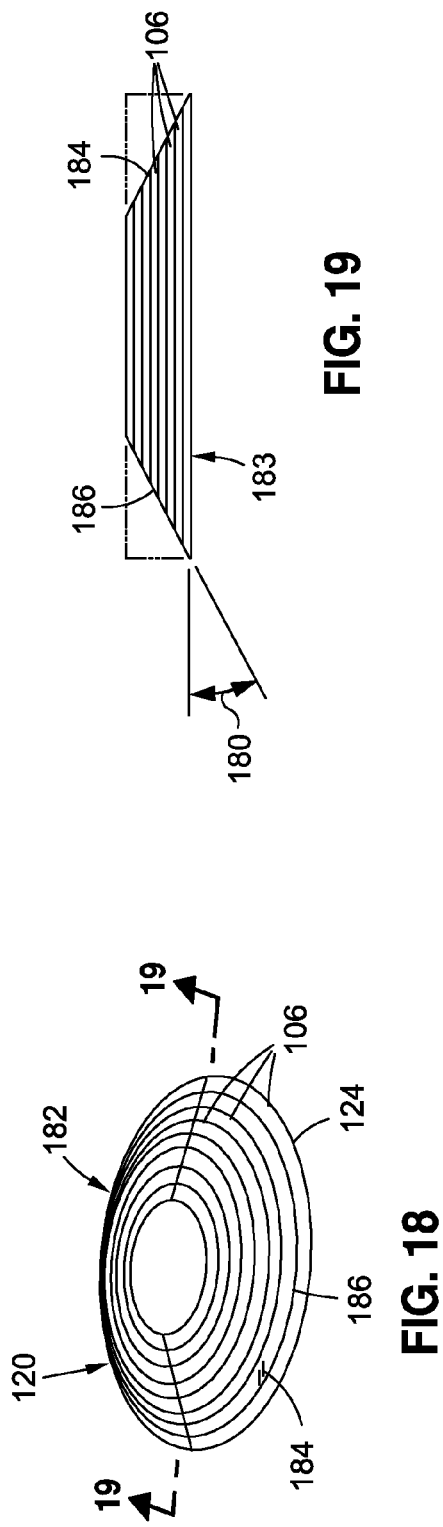

FORMING OF STAGED THERMOSET COMPOSITE MATERIALS

FIELD

The present disclosure relates generally to composites manufacturing and, more particularly, to the forming of thermoset composite articles using a staged curing process.

BACKGROUND

Traditional methods of manufacturing thermoset composite articles include laying up composite plies over a forming die or tool. Heat and pressure are then applied to the composite layup to consolidate and cure the composite layup. In some traditional fabrication methods, the consolidation and curing of composite layups must be performed inside of an autoclave to provide the compaction pressure required to achieve the necessary mechanical properties for the cured composite article.

Traditional autoclave processing of thermoset composite materials may require extended periods of time during which heat and pressure are applied to a composite layup on a forming tool. For example, the consolidation and curing of a composite layup in an autoclave can take up to 24 hours. Unfortunately, autoclaves are generally expensive to construct and operate. Furthermore, the forming tools or dies over which the composite parts are laid up are relatively expensive to manufacture and maintain. For production programs requiring a high volume of thermoset composite parts, a large number of forming tools may be required. The combination of expensive forming tools and autoclave processing translates into an overall high cost of production.

As can be seen, there exists a need in the art for a method of manufacturing thermoset composite parts that allows for high production rates with reduced manufacturing costs.

SUMMARY

The above-noted needs associated with manufacturing thermoset composite parts are addressed by the present disclosure which provides a method of forming a composite article and which includes initially curing a composite laminate at an initial temperature to an initial cure stage of 30-50 percent of full cure and beyond a gel point to form an initially-cured composite laminate. The method may include heating the initially-cured composite laminate to an intermediate temperature higher than the initial temperature and above a resin glass transition temperature. In addition, the method may include intermediately curing the composite laminate to an intermediate cure stage of 50-70 percent of full cure while on a final forming tool to form an intermediately-cured composite laminate. Furthermore, the method may include removing the intermediately-cured composite laminate from the final forming tool, and finally curing the intermediately-cured composite laminate at a final temperature higher than the intermediate temperature to a final cure stage.

Also disclosed is a method of reworking an existing composite structure, and which may include heating a thermoset composite laminate to an initial temperature, and initially curing the composite laminate at the initial temperature to an initial cure stage of 30-50 percent of full cure and beyond a gel point to form an initially-cured composite laminate. The initially-cured composite laminate may then be heated to a temperature higher than the initial temperature and above a resin glass transition temperature. The method may also include forming the initially-cured composite laminate at the higher temperature to a contour of an existing composite structure, and finally curing the composite laminate at the higher temperature to a final cure stage with the composite laminate conformed to the contour of the existing composite structure.

In a further embodiment, disclosed is a method of reworking an existing composite structure and which includes the steps of heating a composite laminate to an initial temperature, and initially curing the composite laminate at the initial temperature to an initial cure stage of 30-50 percent of full cure and beyond a gel point to form an initially-cured composite laminate. The method also includes heating the composite laminate to an intermediate temperature and holding for an intermediate dwell time while forming to a contour of the existing composite structure. The method additionally includes ramping up the temperature of the composite laminate from the intermediate temperature to a final temperature above the intermediate temperature and holding for a final dwell time. Also, the method includes finally curing the composite laminate at the final temperature to a final cure stage while bonding to the existing composite structure during the final dwell time.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 illustrates the layup of a composite laminate from one or more rolls of composite material;

FIG. 4 is a sectional view of the initial curing of the composite laminate under vacuum bag pressure at an initial temperature beyond the gel point of the resin;

FIG. 5 is a perspective view of the initially-cured composite laminate;

FIG. 6 illustrates the trimming of the initially-cured composite laminate into a perimeter shape;

FIG. 7 is a perspective view of the initially-cured composite laminate following the trimming operation;

FIG. 10 is a perspective view of the intermediately-cured composite laminate after removal from the final forming tool;

FIG. 11 illustrates a plurality of intermediately-cured composite laminates placed inside of an oven for final curing at a final temperature;

FIG. 16 illustrates the trimming of an initially-cured composite laminate into a patch for the rework area of the existing composite structure;

FIG. 17 is a perspective view of the patch following the trimming operation;

FIG. 18 is a perspective view of the patch following the machining of a scarf edge onto the perimeter of the patch;

FIG. 19 is a sectional view of the patch taken along line 19 of FIG. 18 and illustrating the scarf angle;

DETAILED DESCRIPTION

Figure 1:
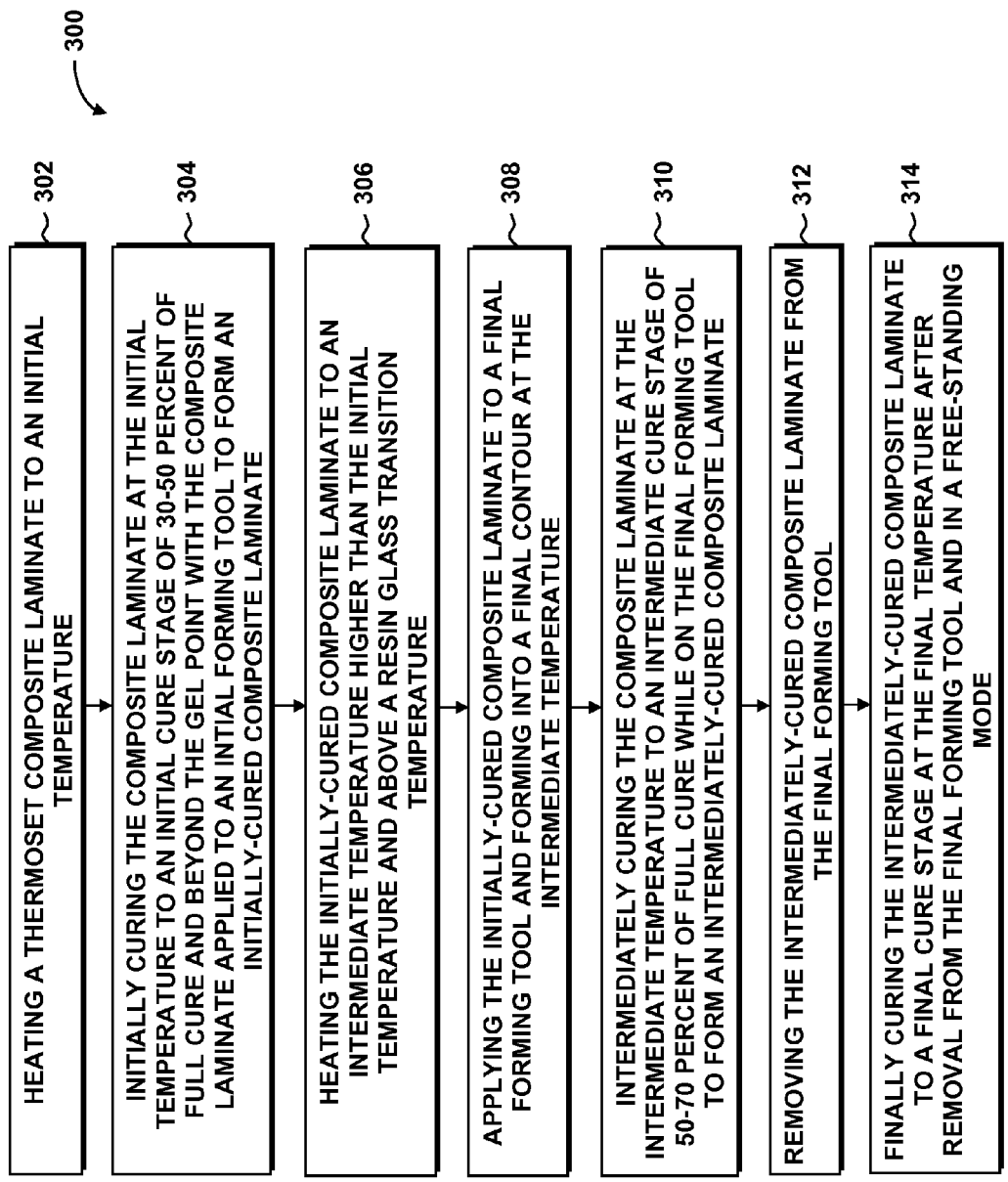
FIG. 1 is a flow diagram including one or more operations that may be included in a method of forming a composite article.
Figure 2:
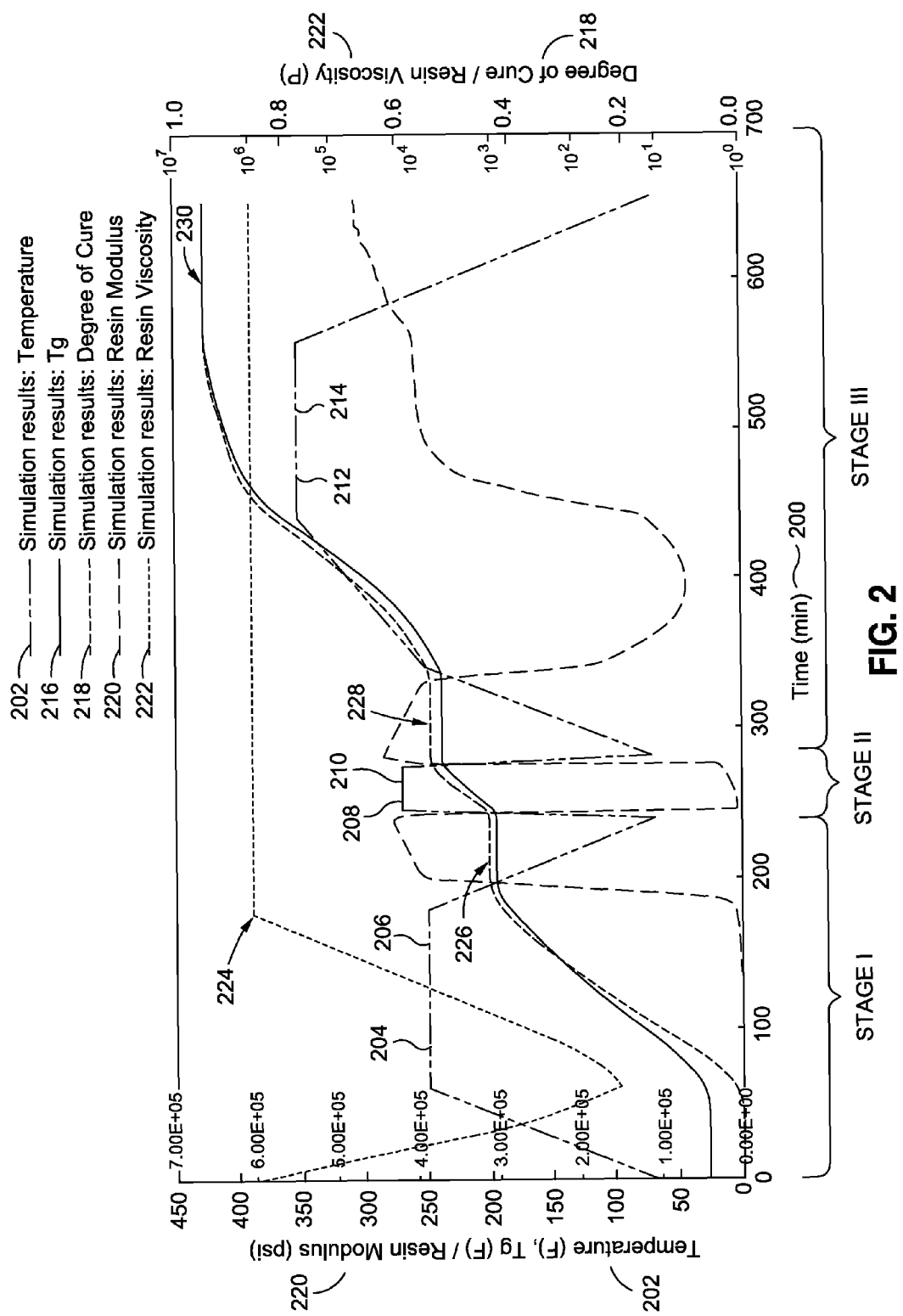
FIG. 2 is a plot of various processing parameters vs. time for the method of forming the composite article illustrated in the flow diagram of FIG. 1.

Referring now to the drawings wherein the showings are for purposes of illustrating various embodiments of the disclosure, shown in FIG. 1 is a flow diagram including one or more operations that may be included in a method of forming a composite article 134 (FIG. 11). The method includes forming a composite article 134 from thermoset composite material 100 (FIG. 3) in a staged forming process. The composite material 100 may be a fiber-reinforced thermoset resin material. In one example, the staged forming process includes initially consolidating and curing a thermoset composite laminate 102 (FIG. 3) at an initial temperature 204 (FIG. 2) above the gel point 224 (FIG. 2) to an initial cure stage 226 (FIG. 2) on a low-cost (e.g., flat) initial forming tool 116 (FIG. 3), after which the initially-cured composite laminate 120 may be removed from the initial forming tool 116 and stored at room temperature. Simple preforms may be trimmed or machined from the initially-cured composite laminate 120 (FIG. 6). The initially-cured composite laminate 120 may then be heated above the glass transition temperature 216 (FIG. 2), and formed to a final contour 132 during a relatively short residence time on a final forming tool 130 (FIG. 8) and cured to an intermediate cure stage 228 (FIG. 2). The intermediately-cured composite laminate 128 may then be removed from the final forming tool 130 and post-cured free-standing to a final cure stage 230 (FIG. 2) while maintaining dimensional stability, as described in greater detail below.

FIG. 2 is a plot of various resin properties vs. time 200 in a computer simulation of an example of a staged process of forming a thermoset composite article according to the method shown in FIG. 1 using an epoxy-based resin system designated as Cycom™ 5320-1 commercially available from Cytec Engineering of Woodland Park, N.J. FIG. 2 illustrates the cure kinetics and the property development of the resin during the staged process of forming the composite article 134. As indicated in the legend shown in the lower right-hand corner of the plot of FIG. 2, the temperature 202 of the resin or composite laminate 102 is represented by a phantom line, the glass transition temperature 216 is represented by a solid line, the degree of cure 218 of the resin is represented by a short dashed line, the resin modulus 220 is represented by a long dashed line, and the resin viscosity 222 is represented by a dotted line.

Referring to FIG. 3, shown is the layup 104 of a composite laminate 102 which may be dispensed from one or more rolls of composite material 100. In one example, the method may include laying up one or more thermoset prepreg composite plies 106 from one or more rolls of thermoset prepreg. A material roll may include organized tows of structural reinforcing fibers 110 embedded in resin 108. The fibers 110 may be arranged in any one of a variety of different configurations and/or fiber orientations (e.g., 0, 22.5, 30, 45, 60, 75, 90 degrees or other fiber angles). For example, the fibers 110 may be oriented unidirectionally or in a bidirectional arrangement. Alternatively, the composite material 100 may be provided as multi-axial fabric, woven fabric, braided fabric, warp-knit fabric, chopped fiber mats, or any one of a variety of other fiber configurations.

The material from which the fibers 110 (FIG. 3) may be formed may include aramids, polyolefins, metal, glass, carbon, boron, ceramic, mineral, and any one of a variety of other materials or combination of materials. For example, the fibers 110 may be formed of any one of the following materials: polyamide, polyimide, polyamide-imide, polyester, polybutadiene, polyurethane, polypropylene, polyetherimide, polysulfone, polyethersulfone, polyphenylsulfone, polyphenylene sulfide, polyetherketone, polyetheretherketone, polyarylamide, polyketone, polyphthalamide, polyphenylenether, polybutylene terephthalate, polyethylene terephthalate, polyester-polyarylate, polyaramid, polybenzoxazole, viscose, and other materials or material combinations.

The resin 108 may be applied to the fibers 110 such that the fibers 110 are pre-impregnated (i.e., prepreg) within the resin 108 or the resin 108 may be applied after laying up dry fiber composite plies (not shown). The resin 108 may be provided in a desired amount to provide the desired fiber volume fraction of the final composite article 134. The resin 108 may be provided in any one of a variety of material compositions including, but not limited to: acrylics, epoxies, fluorocarbons, polyamides, polyethylenes, polyesters, polypropylenes, polycarbonates, polyurethanes, polyetheretherketones, polyetherketoneketones, polyetherimides, and other material compositions. As an alternative to prepreg composite material, the method may include laying up one or more dry fiber composite plies into a stacked formation (not shown), and infusing the dry fiber stacked with resin using any one of a variety of resin infusion processes such as resin film infusion (RFI) or a liquid resin infusion process such as a vacuum assisted process. In one example, the methods disclosed herein may be implemented with composite material 100 (e.g., composite plies) comprised of an epoxy-based resin system such as the above-mentioned Cycom™ 5320-1 material system, or to any other material system having similar chemical and mechanical properties.

In FIG. 3, the composite material 100 may be laid up as one or more composite plies 106 and trimmed along a trim line 112 to form a composite layup 104 or composite laminate 102. For example, multiple plies 106 of thermoset prepreg may be laid up on a layup table (not shown). Alternatively, multiple plies of thermoset prepreg may be laid up on an initial forming tool 116 as shown in FIG. 3. Advantageously, the initial forming tool 116 may be provided as a simple and relatively low-cost tool such as a flat initial forming tool 116. The flat initial forming tool 116 may be used to form the composite layup 104 prior to consolidating and initially curing the composite laminate 102 into a flat panel 114, and may thereby avoid the lengthy residence times associated with laying up, consolidating, and curing composite laminates on relatively expensive final forming tools in traditional composites manufacturing.

In the present disclosure, the composite plies 106 may be stacked according to a predetermined stacking sequence to achieve the desired strength, stiffness, and other mechanical properties of the final composite article 134. In one example, the method may include laying up the composite laminate 102 as a quasi-isotropic laminate containing 0, ±45, and 90 degree plies prior to initially curing the composite laminate 102. Alternatively, as mentioned above, the method may include laying up multiple plies of dry fiber, and infusing the fibers with resin to form the composite laminate 102. A composite laminate 102 may be laid up of prepreg composite material 100 or of dry fiber composite material to form a constant-thickness laminate. In some examples, a composite laminate 102 may be laid up, consolidated, and cured as a flat panel 114 (FIG. 3) in standardized gauges or thicknesses such as a 3-ply laminate, a 5-ply laminate, a 10-ply laminate, or any other laminate thickness.

Referring to FIG. 4, Step 302 of the method 300 of FIG. 1 may include heating the thermoset composite laminate 102 (e.g., the composite layup) to an initial temperature 204 (FIG. 2). FIG. 4 shows the initial curing of the thermoset composite laminate 102 on the initial forming tool 116 under vacuum bag pressure at an initial temperature 204 beyond the gel point 224 (FIG. 2) of the resin. The composite laminate 102 may be covered by a bagging assembly 140 including a bagging film 142 which may be sealed along the perimeter edges of the film using an edge sealant 146. The bagging assembly 140 may include one or more layers such as a breather layer 144 to facilitate a substantially uniform application of vacuum pressure 148 to consolidate the composite laminate 102 against the flat tooling surface 118 of the initial forming tool 116. Additional layers may be included in the bagging assembly 140 such as a release layer for removal of the bagging assembly 140 from the composite laminate 102, and a release coat or film which may be applied to the flat tooling surface 118 prior to laying up the composite plies 106. A vacuum pressure 148 may be applied to the bagging film 142 by a vacuum source 150 such as a vacuum pump to apply compaction pressure for consolidating the thermoset composite laminate 102. Although the composite laminate is vacuum-bagged in FIG. 4, consolidation may be performed using other means for applying compaction pressure including, but not limited to, a mechanical press, a caul plate, or other compaction means.

Step 304 of the method 300 of FIG. 1 may include initially curing and consolidating the composite laminate 102 on an initial forming tool 116 at the initial temperature 204 (FIG. 2). In some examples, the composite laminate 102 may be held at the initial temperature 204 in order to cure the composite laminate 102 to an initial cure stage 226 (FIG. 2) of 30-50 percent of full cure and beyond the gel point 224 (FIG. 2) to form an initially-cured composite laminate 120. As indicated above, the method may include curing the composite laminate 102 as a flat panel 114 on the flat tooling surface 118 of the initial forming tool 116. However, in other examples, the method may include consolidating and curing the composite laminate 102 on a non-flat initial forming tool (not shown).

Prior to initially curing the composite laminate, the method may include consolidating the composite laminate 102 by applying pressure to the composite laminate 102 against the initial forming tool 116 in order to compact and intimately bond the stack of composite plies 106 to one another to achieve the desired fiber volume fraction and to expel volatiles and prevent the occurrence of voids in the composite laminate 102. In some examples, the step of consolidating the composite laminate 102 may include vacuum bagging the composite laminate 102 as described above. In further examples, the method may include inspecting the initially-cured composite laminate 120 for voids or other non-conformances using any suitable testing method including nondestructive testing (e.g., ultrasonic testing) following the initial cure stage 226 and prior to intermediately curing the composite laminate 102.

During consolidation and cure, heat 152 (FIG. 4) may be applied to the composite laminate 102 by any one of a variety of different heating mechanisms to elevate the temperature of the composite laminate 102 to the initial temperature 204 and maintain the initial temperature 204 for a desired initial dwell time 206 period (FIG. 2). Heat 152 may be applied by a heating device such as an oven, an autoclave, a heating blanket, or by other means including, but not limited to, radiation heating, convection heating, conduction heating, forced-air heating, heated tooling, or by other means. As indicated above, heat 152 may be applied to increase the temperature of the composite laminate 102 to the initial temperature 204 to cure the composite laminate 102 to an initial cure stage 226 of 30-50 percent of full cure and at least beyond the gel point 224 to form an initially-cured composite laminate 120. The gel point 224 may be described as the point at which cross-linking of the thermoset polymer transitions the resin from a liquid state to solid state such that the resin no longer flows. In some examples, the method may include initially curing the composite laminate 102 to approximately 40 percent of full cure.

FIG. 2 illustrates Stage I of the staged forming and curing process. Stage I includes increasing the temperature of the composite laminate 102 to the initial temperature 204 and holding for an initial dwell time 206, followed by a gradual reduction or removal of heat. Also shown is the gradual increase in resin glass transition temperature 216 and gradual increase in the degree of cure 218 which corresponds to the increase in the temperature 202 of the composite laminate 102 and the initial dwell time 206 at the initial temperature 204. In addition, shown is an initially gradual reduction and subsequent gradual increase in the resin viscosity 222 as the temperature of the composite laminate 102 increases and is held at the initial temperature 204 during the initial dwell time 206. For the epoxy-based resin system (e.g., Cycom™ 5320-1), the temperature 202 of the composite laminate 102 is increased from room temperature to an initial temperature 204 of 250° F. and held for an initial dwell time 206 of approximately 2 hours during the initial cure stage 226, after which the temperature 202 of the initially-cured composite laminate 120 may be allowed to reduce down to its original temperature (e.g., room temperature), resulting in the initially-cured flat composite laminate 102 being cured to approximately 40 percent of full cure.

FIG. 5 is a perspective view of the initially-cured composite laminate 120 shown as a quasi-isotropic laminate after removal from the initial forming tool 116. Advantageously, curing of the composite laminate 102 to an initial cure stage 226 of between approximately 30-50 percent of full cure and at least beyond the gel point 224 may allow the initially-cured composite laminate 120 to be stored at room temperature, and thereby avoiding the traditional requirement of storing prepreg materials at relatively cold temperatures (e.g., at 0° F. or colder) to maintain the shelf life of the prepreg. In this regard, the present disclosure allows for storage of an initially-cured composite laminate 120 in a relatively low-humidity environment or humidity-controlled environment (e.g., a plastic bag) without the need for refrigeration. The initially-cured composite laminate 120 may optionally be stored in a UV-protected environment such as a black nylon bag to extend the shelf life of the initially-cured composite laminate 120.

FIG. 6 illustrates the optional trimming of the initially-cured composite laminate 120 into a perimeter shape 124 after removal from the initial forming tool 116. As indicated above, the initially-cured composite laminate 120 may be formed as a flat panel 114, and may be trimmed to a final perimeter shape 124 with a trimming device 122 using any number of a variety of cutting techniques. For example, the initially-cured composite laminate 120 may be provided as a flat panel 114 which may be trimmed to a perimeter shape 124 using a water jet cutter, a laser, or a mechanical cutting device such as a router or a reciprocating saw blade, or other cutting techniques.

FIG. 7 is a perspective view of the initially-cured composite laminate 120 following the trimming operation of FIG. 6. Although shown in the shape of a bracket having a plurality of holes 126, the initially-cured composite laminate 120 may be trimmed into any one of a variety of different shapes to form a preform for subsequent curing during the staged curing process. For example, the initially-cured composite laminate 120 may be may be formed in a size and shape to accommodate a large quantity of similarly-shaped small parts such as clips, brackets, shear ties, or any one variety of other configurations that may be subsequently cured on one or more final forming tools 130, as described below. Advantageously, the initial cure stage 226 of 30-50 percent of full cure and at least beyond the gel point 224 may provide mechanical stability to the composite laminate 102 to allow the initially-cured composite laminate 120 to be trimmed or machined.

Figure 8:
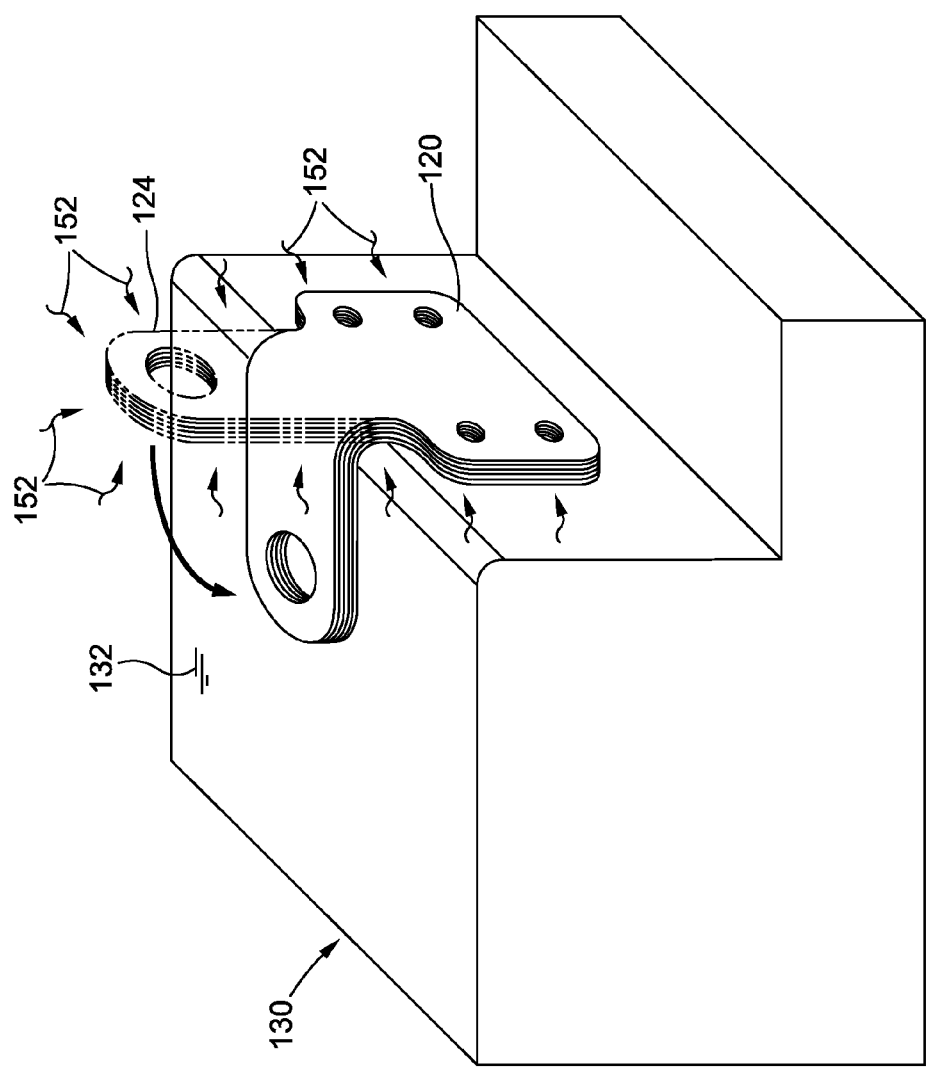
FIG. 8 illustrates the application of the initially-cured composite laminate to a final forming tool while heating the composite laminate to an intermediate temperature above a resin glass transition temperature.

Step 306 of the method 300 of FIG. 1 may include heating the initially-cured composite laminate 120 (e.g., flat panel) to an intermediate temperature 208 to allow for forming a flat composite laminate 102 to a final contour 132. FIG. 8 illustrates the application of the initially-cured composite laminate 120 to the final contour 132 of a final forming tool 130 prior to or during the heating of the composite laminate 102 to the intermediate temperature 208 and holding at the intermediate temperature 208 for an intermediate dwell time 210. The initially-cured composite laminate 120 may be applied to the final forming tool 130 at any point after removal of the initially-cured composite laminate 120 from the initial forming tool 116. For example, as indicated above, the initially-cured composite laminate 120 may be stored in a humidity-controlled and/or UV-protected environment for any length of time prior to final forming of the composite laminate 102.

The initially-cured composite laminate 120 may be heated to an intermediate temperature 208 (FIG. 2) higher than the initial temperature 204 (FIG. 2) and above a resin glass transition temperature 216 (FIG. 2). The intermediate temperature 208 may be selected to be above the glass transition temperature 216 to allow the resin to soften enough to form the composite laminate 102 without adversely affecting the mechanical performance of the final composite article 134. The initially-cured composite laminate 120 may be heated to a predetermined temperature above the resin glass transition temperature 216. For example, the resin may be heated to at least approximately 20° F. (e.g., 20-90° F.) above the resin glass transition temperature 216 to allow for resin softening to an extent allowing forming of the flat composite laminate 102 into a final contour 132.

Figure 9:
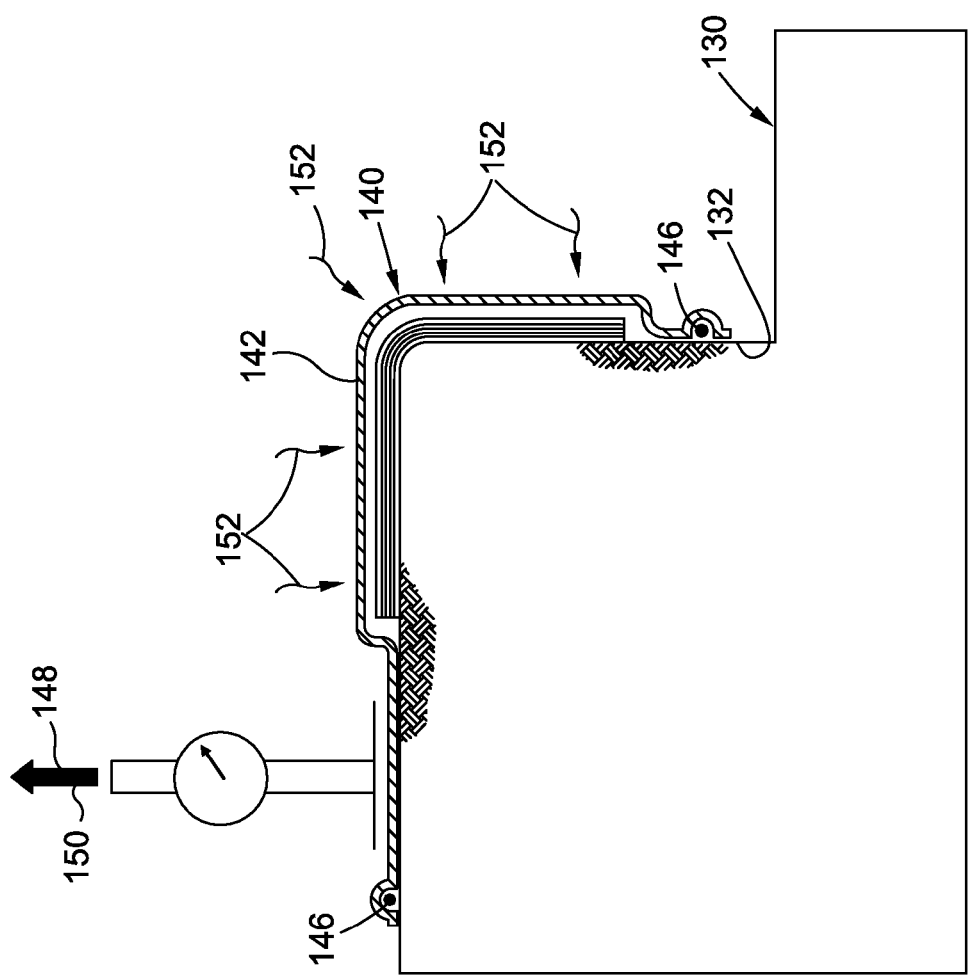
FIG. 9 is a sectional view of the composite laminate at the intermediate temperature compacted under vacuum bag pressure against the final forming tool to form an intermediately-cured composite laminate.

Step 308 of the method 300 of FIG. 1 may include applying the initially-cured composite laminate 120 to the final forming tool 130 and forming the composite laminate 102 into the final contour 132 of the final forming tool 130 at the intermediate temperature 208 (FIG. 2). FIG. 9 is a sectional view of the composite laminate 102 at the intermediate temperature 208 and formed against the final forming tool 130 under vacuum bag pressure to form an intermediately-cured composite laminate 128. Although a bagging assembly 140 (described above) is shown conforming the composite laminate 102 to the final contour 132 of the final forming tool 130 under vacuum pressure 148, the composite laminate 102 may alternatively be formed using any one of a variety of forming mechanisms including, but not limited to, drape forming using a rubber sheet or other elastomeric membrane, forming using a caul plate, or forming using another mechanism. Heat 152 may be applied using any one of the above-described mechanisms for heating the composite laminate 102 during the initial cure stage 226, including the use of a heating blanket, an oven, an autoclave, a radiation heating device, a device for heating the forming tool, or any other type of heating device.

Step 310 of the method 300 of FIG. 1 may include intermediately curing the composite laminate 102 while maintaining the composite laminate 102 at the intermediate temperature 208 (FIG. 2) and forming to the final contour 132 of the final forming tool 130. The composite laminate 102 may be cured to an intermediate cure stage 228 (FIG. 2) of 50-70 percent of full cure while the composite laminate 102 may be compacted against the final forming tool 130 to form an intermediately-cured composite laminate 128 (FIG. 10). The step of intermediately curing the composite laminate 102 may include curing the composite laminate 102 to approximately 60 percent of full cure. Advancing the composite laminate 102 to 50-70 percent of full cure may allow the composite laminate 102 to retain its dimensional stability when removed from the final forming tool 130 and the intermediately-cured composite laminate 128 is free-standing and unsupported.

FIG. 2 illustrates Stage II of the forming and curing process for the above-described epoxy based resin system (e.g., Cycom™ 5320-1) and which includes increasing the temperature of the initially-cured composite laminate 120 to an intermediate temperature 208 of 270° F. Stage II includes holding the composite laminate 102 at the intermediate temperature 208 for an intermediate dwell time 210. As can be seen in FIG. 2, the increase in temperature of the epoxy based resin system from an original temperature (e.g., room temperature) to the intermediate temperature 208 results in a sudden decrease in the resin modulus 220 which corresponds to the softening of the resin allowing the composite laminate 102 to be formed without adversely affecting the mechanical properties of the final composite article 134. The intermediate dwell time 210 during which the composite laminate 102 is applied to the final forming tool 130 may be limited to the amount of time necessary to advance the composite laminate 102 to 50-70 percent of full cure. For example, FIG. 2 illustrates a relatively short final dwell time 214 of less than 1 hour with the composite laminate 102 mounted on the final forming tool 130 to achieve the intermediate cure stage 228. By minimizing the residence time of the composite laminate 102 on the relatively expensive final forming tool 130, the total quantity of final forming tools required for a large production run of composite parts may be reduced which may translate into an overall reduction in production cost and a shortened production schedule.

Step 312 of the method 300 of FIG. 1 may include removing the intermediately-cured composite laminate 128 from the final forming tool 130. Due to the cure level of the composite laminate 102 at 50-70 percent of full cure in the intermediate cure stage 228, the intermediately-cured composite laminate 128 may maintain dimensional stability without changing shape when unsupported by the final forming tool 130. FIG. 10 is a perspective view of an intermediately-cured composite laminate 128 in a free-standing mode after removal from the final forming tool 130.

Step 314 of the method 300 of FIG. 1 may include heating the intermediately-cured composite laminate 128 to a final temperature 212 (FIG. 2) while the composite laminate 102 is removed from the final forming tool 130. The final temperature 212 may be higher than the intermediate temperature 208. Step 314 may additionally include maintaining the composite laminate 102 at the final temperature 212 for a final dwell time 214 (FIG. 2) during the curing of the composite laminate 102 to a final cure stage 230 (e.g., fully cured) after removal from the final forming tool 130. The composite laminate 102 may be heated from the original temperature (e.g., room temperature) to the final cure temperature. Alternatively, the composite laminate 102 may be heated in a stepwise manner at any one of a variety of different heating rates up to the final temperature 212.

FIG. 11 illustrates a plurality of intermediately-cured composite laminates 128 suspended from hangers 156 inside of an oven 154 for final curing of the composite laminates 102 at the final temperature 212 to form composite articles 134. Although shown in an oven 154, the composite laminates 102 may be heated using any one of a variety of different means including, but not limited to, an autoclave, forced air heating, radiation heating, or any type of conduction or convection heating or combination of heating techniques. The intermediately-cured composite laminates 128 may be finally cured in a free-standing mode and unsupported by final forming tools 130. In one example, the final curing of the composite laminates 102 may be performed in a continuous process and/or in a batched process. For example, a plurality of composite laminates 102 may be slowly moved through an open oven (not shown) such as on a conveyor belt of suspended from a moving hanger system and may be subjected to the desired heat-up rate, final dwell time, and cool-down rate to achieve full cure.

FIG. 2 illustrates Stage III of the forming and curing process for the above-described epoxy based resin system and which includes increasing the temperature of the intermediately-cured composite laminate 128 from an original temperature (e.g., room temperature) at a relatively high heating rate to an interim temperature of 250° F. The composite laminate 102 is then heated at a relatively slow heating rate up to a final temperature 212 of 350° F. after which the composite laminate 102 is held at the final temperature 212 for a predetermined final dwell time 214. The increase to the final temperature 212 results in an increase in the cure level from the intermediate cure stage 228 to the final cure stage 230 with a corresponding increase in the resin modulus 220 and glass transition temperature 216.

Figure 12:
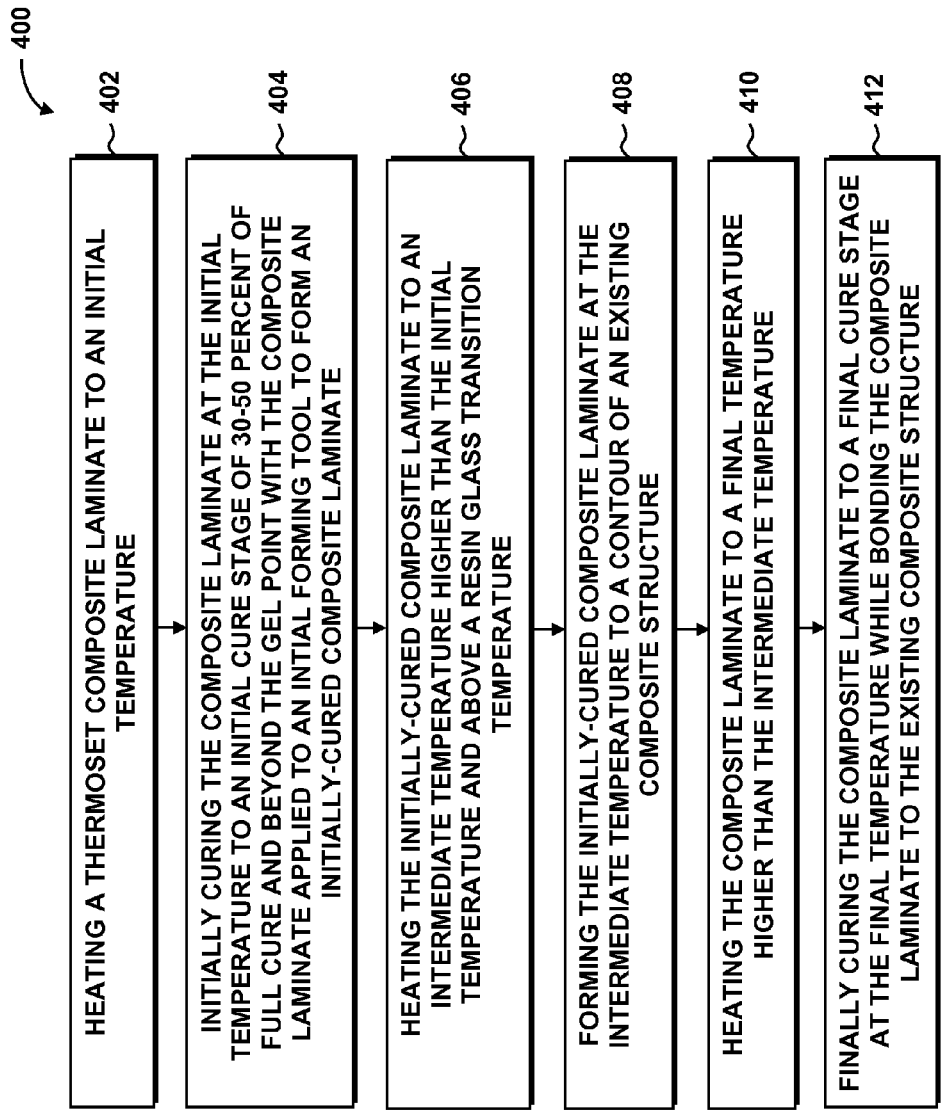
FIG. 12 is a flow diagram including one or more operations that may be included in a method of reworking an existing composite structure.
Figure 14:
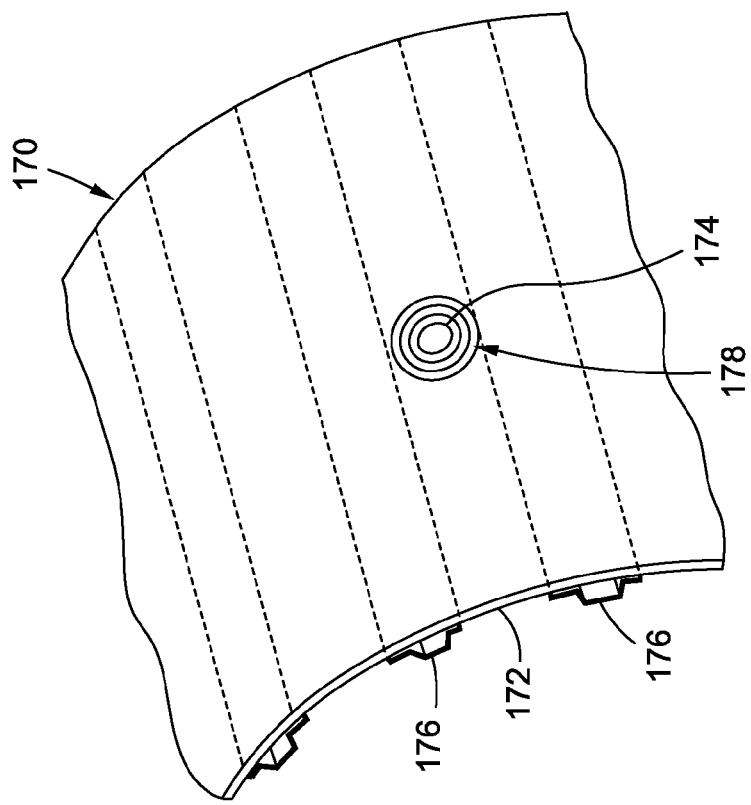
FIG. 14 is a perspective view of an existing composite structure having a rework area.

FIG. 12 is a flow diagram including one or more operations that may be included in a method of reworking an existing composite structure 170 (FIG. 14). The method may include Stage I of initially curing a flat, consolidated composite laminate 102 which may then be trimmed and/or machined to form a patch 182 (FIGS. 18-19) configured to match a rework area 178 (FIGS. 14-15) of an existing composite structure 170. As described in greater detail below, an initially-cured composite laminate 120 (FIG. 16) may be vacuum-formed, cured, and bonded to the rework area 178 of the existing composite structure 170 in a single stage combining the above-described Stages II and III. Advantageously, the staged process for forming, curing, and bonding a composite patch 182 to a rework area 178 may allow for a reduction in the total cycle time associated with conventional rework processes, and may result in an increase in the quality of the rework due to a decrease in porosity of the composite patch 182 allowing for a reduction in strength knock-down factors applied to conventionally-manufactured rework patches. Furthermore, the staged rework process may eliminate the need for cold storage (e.g., a refrigerator) of prepreg rework patches as may be required by conventional methods.

Figure 13:
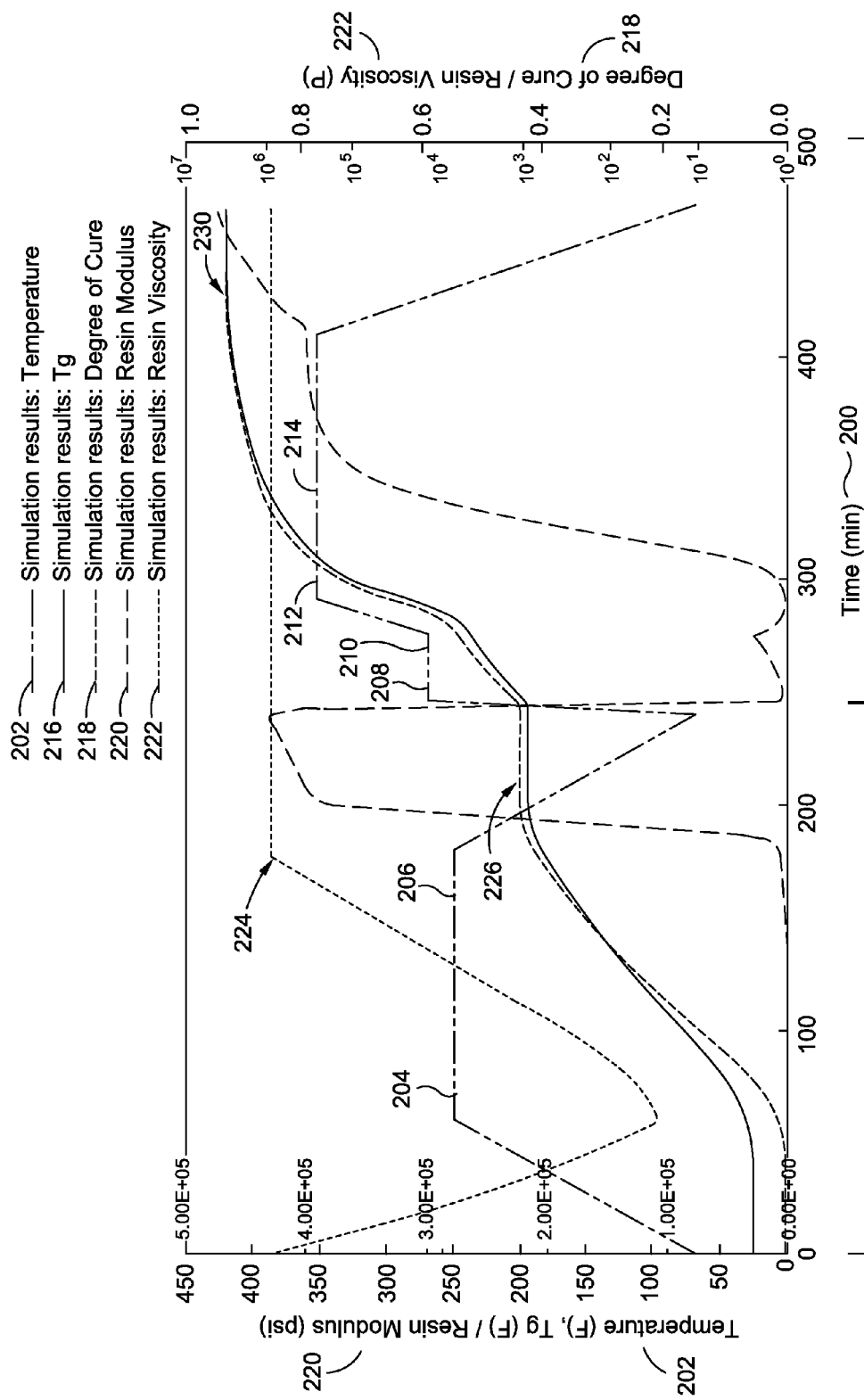
FIG. 13 is a plot of various processing parameters vs. time for the method of reworking an existing composite structure illustrated in the flow diagram of FIG. 12.

FIG. 13 is a plot of various resin properties vs. time 200 in a computer simulation of an example of a staged process of reworking an existing composite structure 170 illustrated in the flow diagram of FIG. 12 using the above-described epoxy-based resin system designated as Cycom™ 5320-1. As indicated above, FIG. 13 illustrates the cure kinetics during the staged process of forming, curing, and bonding a patch 182 to a rework area 178. As indicated above with regard to the plot of FIG. 2, the legend in the lower right-hand corner of FIG. 13 shows the temperature 202 of the resin represented by a phantom line, the glass transition temperature 216 represented by a solid line, the degree of cure 218 of the resin represented by a short dashed line, the resin modulus 220 represented by a long dashed line, and the resin viscosity 222 represented by a dotted line.

FIG. 14 shows an example of an existing composite structure 170 including a skin 172 supported by a plurality of stringers 176. The skin 172 may include a rework area 178 formed by the removal of a portion of the composite material of the skin 172. The rework area 178 may be formed in an outer surface of the skin 172 and may extend at least partially into a thickness in the skin 172. A perimeter edge of the rework area 178 may include a scarf angle 180 along which the depth of the rework area 178 gradually tapers inwardly toward a center portion of the rework area 178 and which may represent a contour 174 of the rework area 178 to which a patch 182 may be applied.

Figure 15:
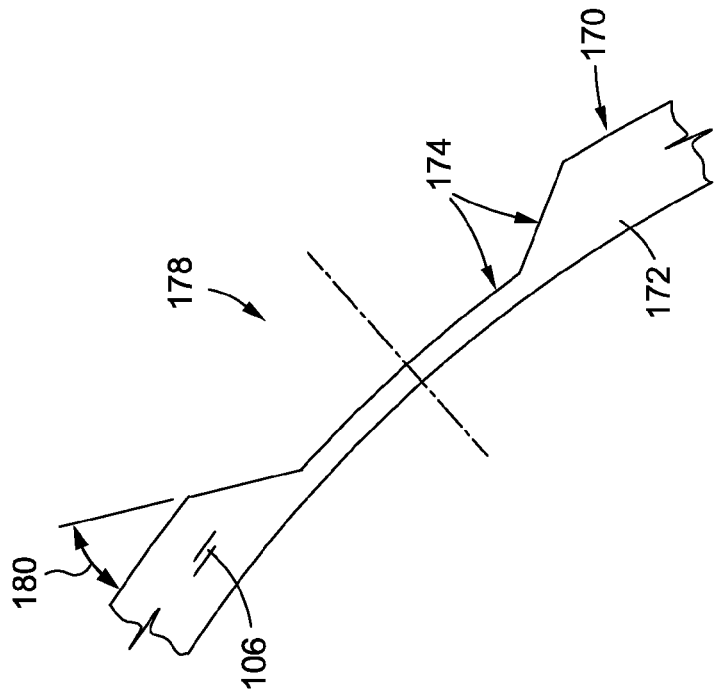
FIG. 15 is a sectional view of the existing composite structure illustrating the contour of a rework area of the existing composite structure.

FIG. 15 is a sectional view of the existing composite structure 170 showing the contour 174 of the rework area 178 including the scarf angle 180 formed around the perimeter of the rework area 178. The scarf angle 180 may allow for the gradual transfer of loads between the existing composite structure 170 and the patch 182 installed in the rework area 178. It should be noted the presently-disclosed staged process of forming, curing, and bonding a patch 182 to a rework area 178 may be performed on any type of structure, without limitation, and is not limited to a curved skin 172 supported by stringers 176. In this regard, the staged process disclosed herein for reworking an existing composite structure 170 may be performed on any one of a variety of different types of structures including vehicular or non-vehicular structures. For example, the presently-disclosed staged rework process may be performed on any portion of an aircraft such as a fuselage, a skin, and/or a control surface.

The method of reworking an existing composite structure 170 may include initially laying up one or more composite plies 106 which may include a thermosetting resin containing reinforcing fibers. In a manner described above with regard to FIGS. 3-5, the method may include laying up multiple plies of thermoset prepreg to form a thermoset composite laminate 102 prior to initially curing the thermoset composite laminate 102. For example, prepreg composite plies 106 may be arranged in a stacking sequence that duplicates the stacking sequence of the composite plies 106 of the skin 172 containing the rework area 178. Alternatively, the method may include laying up multiple dry fiber plies in a skin-duplicating stacking sequence, and infusing the plies with resin to form the thermoset composite laminate 102 prior to initially curing the composite laminate 102.

Step 402 of the method 300 of FIG. 12 may include heating the thermoset composite laminate 102 to the initial temperature 204 (FIG. 13) beyond the gel point 224 (FIG. 13) of the resin and holding the composite laminate 102 at the initial temperature 204 (FIG. 13) for an initial dwell time 206. In a manner described above with regard to FIG. 4, the method may include Step 404 of initially curing the thermoset composite laminate 102 as a flat panel 114 on a flat initial forming tool 116 to an initial cure stage 226 (FIG. 13) of between approximately 30-50 percent of full cure and at least beyond the gel point 224. In one example, the composite laminate 102 may be cured to approximately 40 percent of full cure and at least beyond the gel point 224 of the resin. The composite laminate 102 may be cured to the initial cure stage 226 under vacuum bag pressure or by using other means for applying pressure to the composite laminate 102 including the use of a mechanical press, a caul plate, or other consolidation devices. FIG. 5 shows an example of an initially-cured composite laminate 120 shown as a flat, quasi-isotropic laminate after removal from the initial forming tool 116.

FIG. 13 illustrates Stage I of the computer-simulated staged process for forming and curing the rework patch 182 of the epoxy-based resin system (e.g., Cycom™ 5320-1), and additionally shows the increase in temperature and hold for the initial dwell time 206 at the initial temperature 204, and the corresponding increase in resin glass transition temperature 216 and degree of cure 218, and gradual reduction and subsequent gradual increase in resin viscosity 222 during the initial cure stage 226. As indicated above with regard to the plot of FIG. 2, the temperature of the composite laminate 102 may be increased from room temperature to an initial temperature 204 of 250° F. and held for an initial dwell time 206 of approximately 3 hours during the initial cure stage 226. The temperature may then be allowed to decrease down to the original temperature (e.g., room temperature) resulting in the initially-cured flat composite laminate 102 being cured to a level sufficient to allow for trimming and/or machining of the initially-cured composite laminate 120.

FIG. 16 illustrates the trimming of the initially-cured composite laminate 120 into a perimeter shape 124 to form a patch 182. The patch 182 may be sized and configured complementary to a rework area 178 of an existing composite structure 170. As indicated above, the initially-cured composite laminate 120 may be trimmed using any type of trimming device 122 such as the above-mentioned water jet cutter, a laser device, a router or other rotating cutting tool, a mechanical cutter such as a reciprocating saw blade, or any other type of cutting or trimming device 122. FIG. 17 illustrates the initially-cured composite laminate 120 trimmed into the perimeter shape 124 for the rework area 178 of the existing composite structure 170.

FIGS. 18-19 illustrate the optional step of forming an edge treatment 184 onto the perimeter edge of an initially-cured composite laminate 120 such as a rework patch 182. For example, the method may include machining a scarf edge 186 onto the perimeter edge of the patch 182. The scarf edge 186 may be machined at a scarf angle 180 that matches the scarf angle 180 of the rework area 178 in the existing composite structure 170. Advantageously, the curing of the composite laminate 102 to the initial cure stage 226 of approximately 30-50 percent of full cure and at least beyond the gel point 224 allows for trimming and/or machining of the patch 182 while the patch 182 remains dimensionally stable. In addition, the curing of the composite laminate 102 to the initial cure stage 226 may allow for storage of the patch 182 in a dry or relatively low-humidity environment without the need for refrigeration for an extended period of time relative to the limited shelf life of non-staged (e.g., cured to less than 30 percent of full cure) prepreg material.

Step 406 of the method 300 of FIG. 12 may include heating, after removal from the initial forming die, the initially-cured composite laminate 120 to a temperature higher than the initial temperature 204 (FIG. 13) and above a resin glass transition temperature 216 (FIG. 13) and holding the composite laminate 102 at the higher temperature for a predetermined dwell time to soften the resin to allow for forming the initially-cured composite laminate 120. For example, an initially-cured patch 182 may be removed from a storage device such as a plastic bag, and heated to an intermediate temperature 208 (FIG. 13) of at least approximately 20° F. higher than the initial temperature 204 and above the resin glass transition temperature 216. In some examples, an initially-cured patch 182 may be heated to a temperature in the range of approximately 20-90° F. higher than the initial temperature 204 and above the resin glass transition temperature 216.

Figure 20:
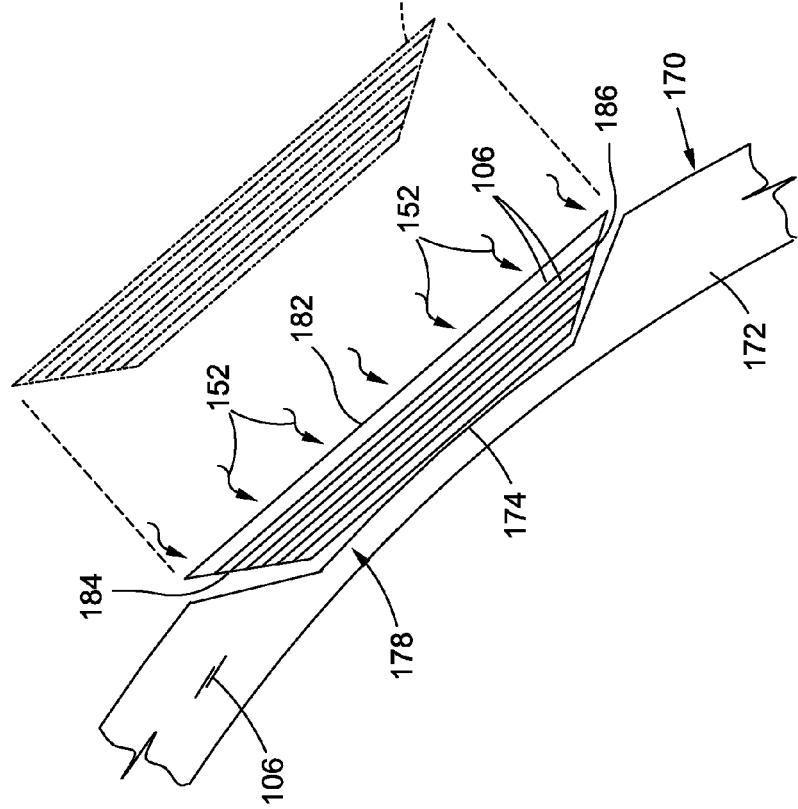
FIG. 20 is a sectional view of the existing composite structure during initial application of the patch to the rework area.

Step 408 of the method 300 of FIG. 12 may include forming the initially-cured composite laminate 120 at the intermediate temperature 208 to a contour 174 of an existing composite structure 170. For example, FIG. 20 illustrates the application of an initially flat patch 182 to the contour 174 of the rework area 178 of the existing composite structure 170 during the application of heat 152 to the patch 182. During installation to the existing composite structure 170, the patch 182 may be aligned with the rework area 178 such that the scarf angle 180 (FIG. 19) of the patch 182 matches the scarf angle 180 (FIG. 15) of the rework area 178. In one example, the flat patch 182 may be formed into the contour 174 (FIG. 15) of the rework area 178 when heated and held at the intermediate temperature 208 with the assistance of compaction pressure that may be applied to the patch 182 such as by using a vacuum bagging assembly 140 (FIG. 21) sealed to the outer surface of the skin 172 surrounding the rework area 178. Alternatively, compaction pressure may be applied to the patch 182 using a caul plate (not shown) or other device for confirming the patch 182 to the rework area 178. The patch 182 may be applied to the rework area 178 after and/or during the heating of the patch 182 to a temperature higher than the initial temperature 204 and above the glass transition temperature 216.

In some examples, the method 300 may include Step 410 of heating the composite laminate 102 to an intermediate temperature 208 (FIG. 13) higher than the initial temperature 204 (FIG. 13) and above the glass transition temperature 216 (FIG. 13) and holding the patch 182 at the intermediate temperature 208 for an intermediate dwell time 210 (FIG.

Figure 21:
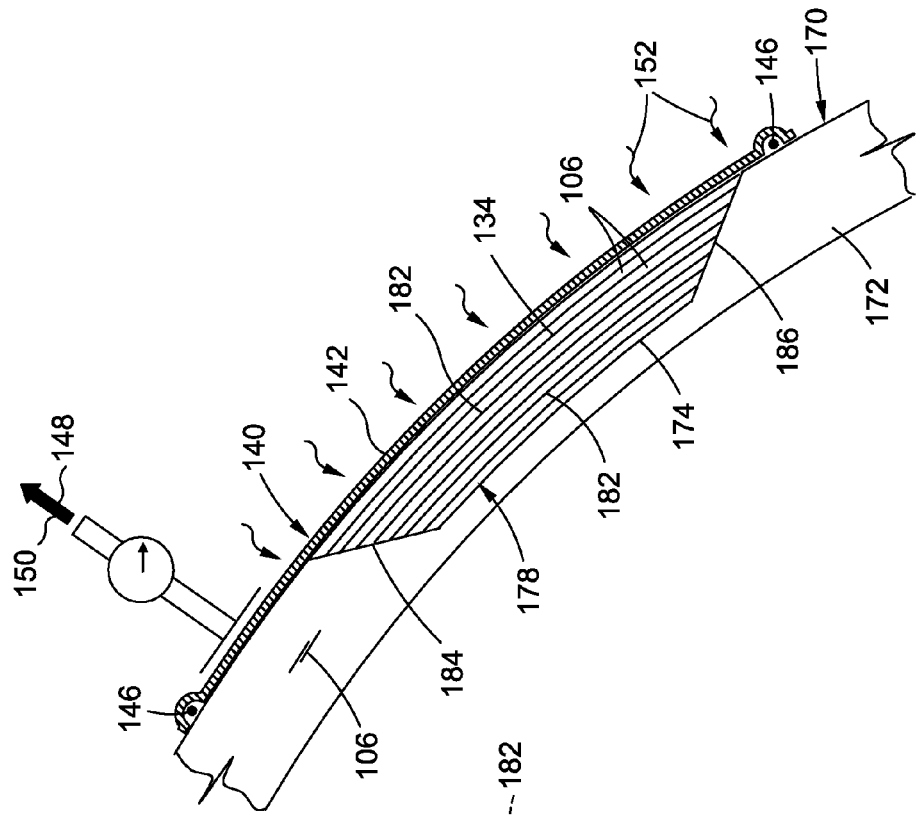
FIG. 21 is a sectional view of the forming of the patch to the existing composite structure under vacuum bag pressure and the curing of the patch at a final temperature.

13) while compacting or forming the composite laminate 102 to the contour 174 of the rework area 178. In other examples, the initially-cured composite laminate 120 may be heated to a final temperature 212 (FIG. 13) that may be higher than the intermediate temperature 208 and above the glass transition temperature 216 while forming the composite laminate 102 to the contour 174 of the rework area 178. The patch 182 may be formed to the contour 174 of the rework area 178 during the application of heat 152 to the patch 182 and/or to the rework area 178 of the existing composite structure 170. FIG. 21 shows the forming and bonding of the patch 182 to the contour 174 of the existing composite structure 170 under vacuum bag pressure of a bagging assembly 140.

Step 412 of the method 300 of FIG. 12 may include finally curing the composite laminate 102 at a final temperature 212 to a final cure stage 230 (e.g., fully cured) while conforming the composite laminate 102 to the existing composite structure 170 during a final dwell time 214. The process of finally curing the composite laminate 102 may include bonding the composite laminate 102 to the existing composite structure 170 during the final dwell time 214 as the composite laminate 102 cures. In some examples, the method may include heating the composite laminate 102 to an intermediate temperature 208 and holding the composite laminate 102 at the intermediate temperature 208 for an intermediate dwell time 210 until the composite laminate 102 is conformed to the contour 174 of the rework area 178, followed by directly ramping the temperature of the composite laminate 102 from the intermediate temperature 208 up to the final temperature 212 above the glass transition temperature 216, and holding the composite laminate 102 at the final temperature 212 for a final dwell time 214 until the composite laminate 102 is finally cured (e.g., fully cured) and bonded to the rework area 178.

In the computer simulation, FIG. 13 illustrates a single stage combining Stages II and III of FIG. 2, wherein the steps of forming, curing, and optionally bonding the initially-cured patch 182 to the rework area 178 are performed for the above-described epoxy based resin system (e.g., Cycom™ 5320-1). As can be seen, during the combined Stages II-III, the temperature of the initially-cured composite laminate 120 is increased from an original temperature (e.g. room temperature) to an intermediate temperature 208 of 270° F. and held at the intermediate temperature 208 for an intermediate dwell time 210 of less than 1 hour which results in a reduction in resin modulus 220 (e.g., resin softening) allowing for the forming of the initially-cured composite laminate 120 to the contour 174 of the rework area 178. Simultaneously during the intermediate dwell time 210, the glass transition temperature 216 and the degree of cure 218 increases with the initially-cured composite laminate 120 at the intermediate temperature 208. Once formed to the contour 174 of the rework area 178, the temperature of the composite laminate 102 is directly ramped up from the intermediate temperature 208 of 270° F. to a final temperature 212 of 350° F. and held at the final temperature 212 for a final dwell time 214 of 2 hours to achieve final cure and to bond the composite laminate 102 to the rework area 178 of the existing composite structure 170.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of forming a composite article, comprising:
initially curing a composite laminate at an initial temperature to an initial cure stage of 30-50 percent of full cure and beyond a gel point to form an initially-cured composite laminate;
heating the initially-cured composite laminate to an intermediate temperature higher than the initial temperature and above a resin glass transition temperature;
intermediately curing the composite laminate to an intermediate cure stage of 50-70 percent of full cure while on a final forming tool to form an intermediately-cured composite laminate;
removing the intermediately-cured composite laminate from the final forming tool; and
finally curing the intermediately-cured composite laminate at a final temperature higher than the intermediate temperature to a final cure stage.

2. The method of claim 1, further including the step of:
laying up the composite laminate on a flat initial forming tool prior to initially curing the composite laminate.

3. The method of claim 1, further including the step of:
laying up multiple plies of thermoset prepreg to form the composite laminate prior to initially curing the composite laminate.

4. The method of claim 1, further including the step of:
laying up multiple plies of dry fiber; and
infusing the plies with resin to form the composite laminate prior to initially curing the composite laminate.

5. The method of claim 1, further including the step of:
consolidating the composite laminate prior to and/or during the initially curing of the composite laminate.

6. The method of claim 5, wherein the step of consolidating includes:
consolidating the composite laminate with vacuum pressure applied by a bagging assembly.

7. The method of claim 1, further including the step of:
trimming the initially-cured composite laminate into a perimeter shape prior to intermediately curing the composite laminate.

8. The method of claim 1, wherein the step of heating the initially-cured composite laminate to the intermediate temperature comprises:
heating the initially-cured composite laminate to at least approximately 20 degrees F. above the resin glass transition temperature.

9. The method of claim 1, wherein the step of initially curing the composite laminate comprises:
initially curing the composite laminate to approximately 40 percent of full cure.

10. The method of claim 1, wherein the step of intermediately curing the composite laminate comprises:
intermediately curing the composite laminate to 60 percent of full cure.

11. A method of reworking an existing composite structure, comprising:
heating a thermoset composite laminate to an initial temperature for an initial dwell time period;
initially curing the composite laminate at the initial temperature to an initial cure stage of 30-50 percent of full cure and beyond a gel point to form an initially-cured composite laminate;
heating the initially-cured composite laminate to a temperature higher than the initial temperature and above a resin glass transition temperature;

forming the initially-cured composite laminate at the higher temperature to a contour of an existing composite structure; and finally curing the composite laminate at the higher temperature to a final cure stage with the composite laminate conformed and joined to the contour of the existing composite structure.

12. The method of claim 11, wherein the step of heating the composite laminate to the temperature higher than the initial temperature and finally curing the composite laminate includes:

heating the composite laminate to an intermediate temperature and holding for an intermediate dwell time during forming of the composite laminate to the contour; and directly ramping from the intermediate temperature to a final temperature above the intermediate temperature to finally cure the composite laminate.

13. The method of claim 11, further including the step of:
consolidating the composite laminate prior to and/or during the initially curing of the composite laminate.

14. The method of claim 13, wherein the step of consolidating includes:
consolidating the composite laminate with vacuum pressure applied by a bagging assembly.

15. The method of claim 11, wherein the step of initially curing the composite laminate comprises:
initially curing the composite laminate to approximately 40 percent of full cure.

16. The method of claim 11, further including the step of:
trimming the initially-cured composite laminate into a perimeter shape to form a patch complementary to a rework area of the existing composite structure.

17. The method of claim 16, wherein the step of trimming the initially-cured composite laminate into a patch includes:
machining an edge treatment onto a perimeter edge of the patch to match a scarf angle formed in the rework area of the existing composite structure.

18. The method of claim 11, wherein the step of heating the initially-cured composite laminate comprises:
heating the initially-cured composite laminate to at least approximately 20 degrees F. above the resin glass transition temperature.

19. The method of claim 11, further including the step of:
laying up multiple plies of thermoset prepreg to form the composite laminate prior to initially curing the composite laminate.

20. A method of reworking an existing composite structure, comprising:

heating a composite laminate to an initial temperature;

initially curing the composite laminate at the initial temperature to an initial cure stage of 30-50 percent of full cure and beyond a gel point to form an initially-cured composite laminate;

heating the composite laminate to an intermediate temperature and holding for an intermediate dwell time while forming to a contour of the existing composite structure;

ramping up the temperature of the composite laminate from the intermediate temperature to a final temperature above the intermediate temperature and holding for a final dwell time; and finally curing the composite laminate at the final temperature to a final cure stage while bonding to the existing composite structure during the final dwell time.

* * * * *